D. A. HAGAN.
Whiffletree Hook.

No. 198,739. Patented Jan. 1, 1878.

WITNESSES.
Charles F. Prichard
N. C. White

INVENTOR.
Daniel A. Hagan,
By his Attorney
Franklin Fox

UNITED STATES PATENT OFFICE.

DANIEL A. HAGAN, OF HOOSICK FALLS, NEW YORK.

IMPROVEMENT IN WHIFFLETREE-HOOKS.

Specification forming part of Letters Patent No. 198,739, dated January 1, 1878; application filed August 3, 1877.

*To all whom it may concern:*

Be it known that I, DANIEL A. HAGAN, of the town of Hoosick Falls, in the county of Rensselaer and State of New York, have invented an Improved Trace-Fastening; and I hereby declare that the following description, in connection with the accompanying drawings, illustrative of said invention, together constitute a specification thereof, wherein the construction and mode of operation of said invention are fully set forth.

Figure 1:
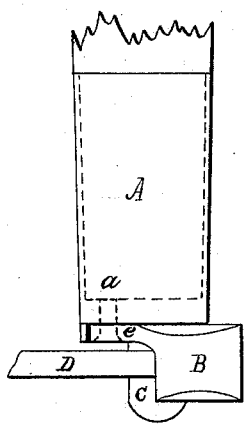
Figure 2:
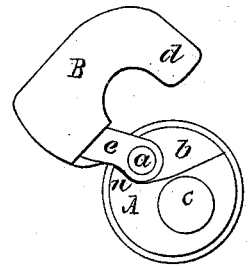
Figure 3:
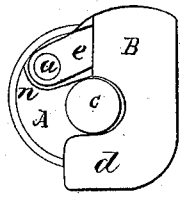
Figure 4:
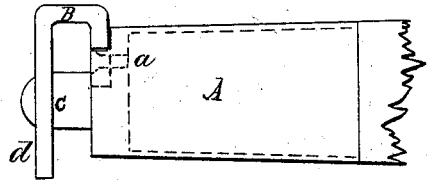

Figure 1 of the drawings shows a plan view of my invention as attached to the end of an ordinary whiffletree with a harness-trace attached. Fig. 2 exhibits a vertical elevation of the trace-fastening with trace detached and guard thrown back, as in position to attach the trace, if desired. Fig. 3 exhibits the fastening with guard thrown down or into the position in which it appears when in use. Fig. 4 shows a side elevation of the fastening with guard turned down.

The advantages secured by the use of this device are facilities for rapidly hitching up or detaching the horse or other animal from the vehicle, as well as the provision of means for so securing the trace to the whiffletree that the same, when in use, will not be liable to be easily unhooked or detached, nor the fastener be liable to get out of order or get lost, the same being permanently attached to the whiffletree.

I contruct a socket-cap, A, which is attached to the end of the whiffletree, having a projecting boss, C, the axis of which is so disposed as not to interfere with the pivoting of the rotating guard B. The boss C is straight, or nearly so, and the end thereof of such form as to enter the hole or eye in the end of the harness-trace without difficulty. A portion of the end of the socket-cap A is recessed away, as shown at *b*, Fig. 2, so as to form a seat for pivoting the guard B, and provide facilities for the free rotation of the arm *e* of guard B, without interference with the trace when connected to the fastening. The guard B is provided with an interior arm, *e*, the end of which is pivoted at *a* to the socket-cap A. It also has an outer and downward-projecting lip or shield, *d*, the interior edge of which is formed in the shape of a hook, as shown, so as to hook down under the outer end of boss C. When thrown up, the posterior edge of arm *e* falls over back against a shoulder, *n*, of socket-cap A, which prevents complete rotation.

The same pattern of this guard B may be used for both ends of the whiffletree; but the preferable mode of application and adjustment is to so attach the device that when draft is applied the pivot *a* shall be in rear of the boss C.

The boss C is smooth and has its end rounded, as shown, and is devoid of any notches, projections, or other peculiarities which would tend to interfere with the easy attachment or detachment of the trace. Unlike many devices now in use, the trace does not have to be turned or twisted out of its working position to be either attached to or disconnected from the whiffletree.

To use this invention, throw up guard B into the position shown in Fig. 2; then attach the trace by slipping the rear end thereof, provided with a hole for that purpose, over the boss C, and then throw guard B down into position, as seen in Fig. 3. In this instance I rely, in part, upon the weight of the dependent portion *d* of the guard B to hold the same in place; but should additional security be deemed necessary, a spring can be attached to the guard B, which shall at all times act upon the same to hold it in position, as seen in Fig. 3; or guard B may be made from such elastic material or in such form as in itself to constitute a spring.

I claim as new and of my invention—

The trace-fastener consisting of a smooth projecting boss or pin, C, to which the harness-trace is attached, in combination with the rotating guard B, pivoted on socket-cap A, arranged and working as shown, substantially as described and set forth.

In testimony whereof I have hereto set my hand at North Bennington, Vermont, this 31st day of July, A. D. 1877.

DANIEL A. HAGAN.

Witnesses:
CHARLES F. PRICHARD,
FRANKLIN SCOTT.